Figure 1:
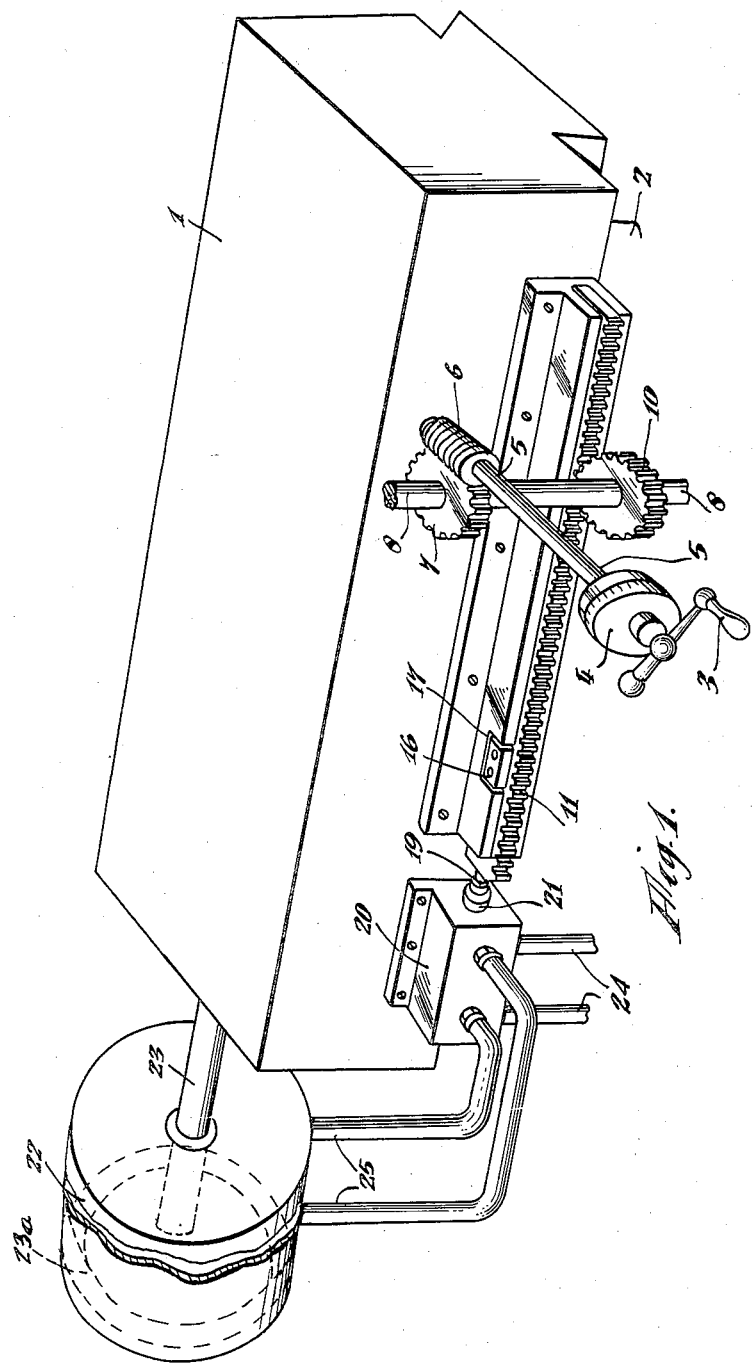

Jan. 31, 1961  J. B. WOODRUFF  2,969,774
SERVO-CONTROL MECHANISM OPERATING MEANS
Filed Aug. 26, 1957  2 Sheets-Sheet 1

Jan. 31, 1961   J. B. WOODRUFF   2,969,774
SERVO-CONTROL MECHANISM OPERATING MEANS
Filed Aug. 26, 1957   2 Sheets-Sheet 2

United States Patent Office 2,969,774
Patented Jan. 31, 1961

2,969,774

SERVO-CONTROL MECHANISM OPERATING MEANS

Joseph B. Woodruff, Leeds, England, assignor to Hayes Engineers (Leeds) Limited, Leeds, England, a British company Filed Aug. 26, 1957, Ser. No. 680,287

3 Claims. (Cl. 121—41)

This invention relates to servo-control mechanisms of the type used in machine tools or other apparatus wherein hydraulic power is required to cause a straight line movement of a unit, such as a worktable or knee. For convenience the terms "machine tool" and "worktable" will be used generally hereafter in describing the invention.

It is well-known to use hydraulic servo-control mechanisms for various purposes and that such devices can be of considerable assistance in moving a worktable in heavy machine tools. At the same time such power must be under easy and accurate control and it is the main object of this invention to provide an improved mechanism of this type.

According to this invention there is provided for a machine tool having a movable worktable mounted to have straight line movements, a servo-control mechanism for controlling the worktable, said mechanism including two engaging parts of which one part is carried by a fixed structure of the machine tool and the other part by the worktable, one of said parts being manual operating means and the other part a rack, said rack being mounted to be capable of slight longitudinal movement, a hydraulic system including a hydraulic motor connected to the worktable, and a control valve in said system mounted adjacent said rack, the arrangement being such that initial movement of the manual operating means causes the rack to move slightly endwise and operate the control valve which admits pressure to the hydraulic motor to move the table so long as the movement of the operating means is continued. The hydraulic motor may be a piston and cylinder.

The invention comprises a servo-control mechanism including a rack carried by the worktable to have limited slight endwise movement, a rotary hand-operated element geared to the rack and carried by the fixed structure of the machine tool, a resiliently loaded control valve engaging one end of the rack, a hydraulic fixed cylinder with its piston connected to the worktable, and a hydraulic pressure system controlled by said valve to operate the piston.

The invention also includes a servo-control mechanism having a rack carried by the fixed structure of the machine tool to have limited slight endwise movement, a rotary hand operated element geared to the rack and carried by the worktable, a resiliently loaded control valve engaging one end of the rack, a hydraulic fixed cylinder with its piston connected to the worktable, and a hydraulic pressure system controlled by said valve to operate the piston.

The connection between the manual operating means and the rack may include a clutch, such as a friction drive clutch.

Figure 2:
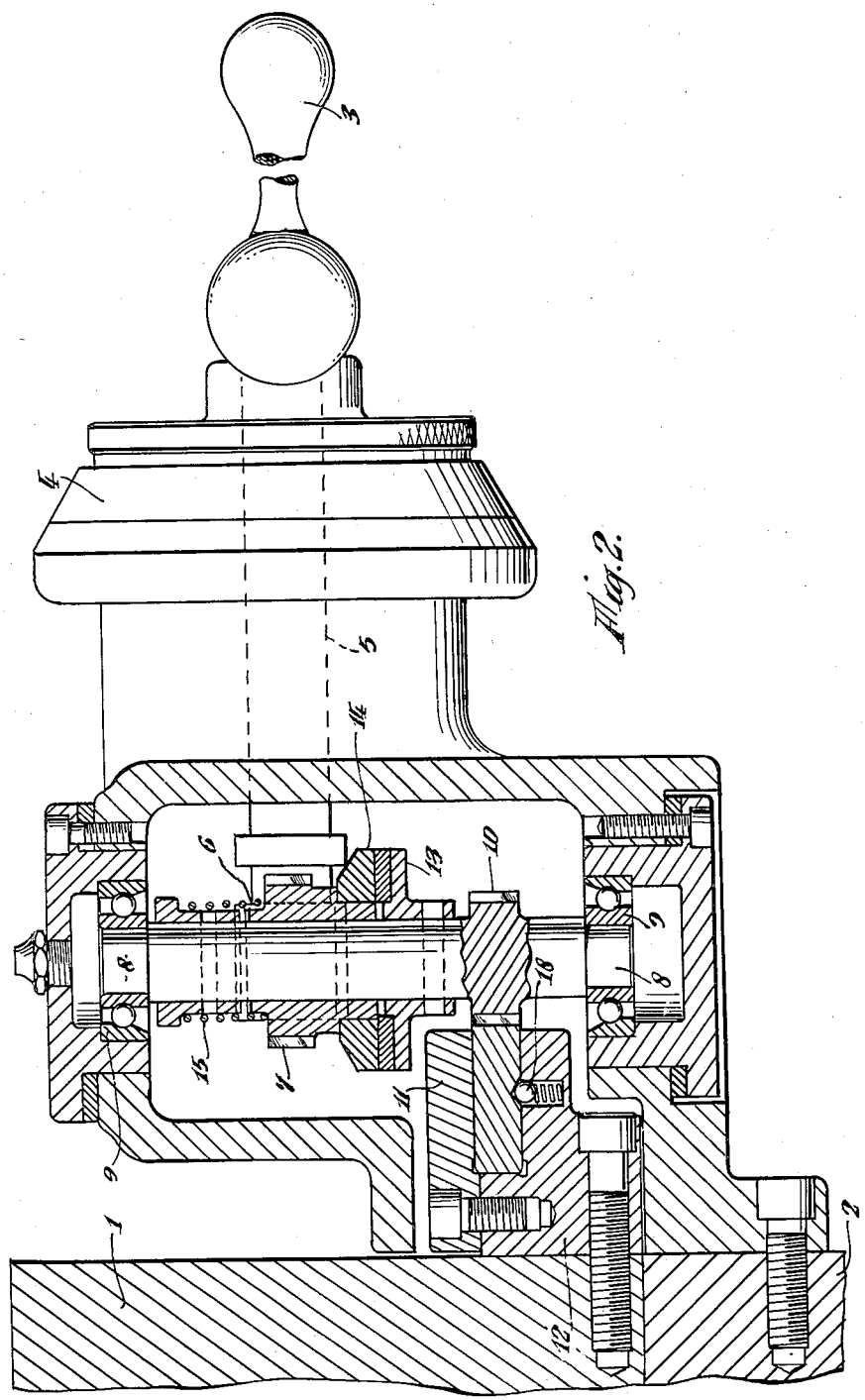

One embodiment of the invention will now be described as applied to a horizontal worktable of a machine tool:

Fig. 1 is a perspective general arrangement view with certain parts removed of the improved servo-control mechanism; and Fig. 2 is a sectional side elevational view of the hand control means.

In the illustrated embodiment of this invention an improved servo-control mechanism is provided for the worktable 1 of a heavy duty machine tool, such as a milling machine. Such mechanism includes hand-operating means secured to the worktable fixed underslide 2 and comprises a known form of rotary handle 3 (or handwheel) with a graduated indication ring or plate 4. The horizontal spindle 5 of the handle is mounted in free running bearings and may include usual motion control means to hold it in a set position and with a worm 6 at its inner end in engagement with a straight-cut or other pinion 7 carried by a vertical spindle 8. This latter spindle is also mounted in free running bearings 9 and includes a rack gear wheel 10 engaging a rack 11 carried by a rack slide 12 secured to the worktable 1. Said vertical spindle 8 also carries a friction drive clutch 13 having one part 14 secured to the said pinion 7 which is loaded by a spring 15 to cause normal engagement of the friction faces of the clutch. The rack 11 is arranged to be capable of slight endwise movement, say in the order of a few thousandths of an inch, in its rack slide 12. This is achieved by furnishing the rack with a stop block 16 mounted to have slight movement in a slot 17 in the rack slide. A spring loaded ball 18 (or other element) is furnished as location means for the rack. One end of this rack has a projection 19 adapted to engage a servo-control valve 20. Said projection is shown as an adjusting screw engaging the end 21 of a piston in the valve, said piston being spring loaded to a closed position against the rack.

The above servo-control valve is located in the hydraulic system of a hydraulic pressurizing source and which system leads to a cylinder 22 whose piston 23a has its rod 23 connected to the worktable 1. Pressure and exhaust pipes 24 are connected to the supply source and pipes 25 between the valve 20 and cylinder 22.

In operation, when the handle 3 is rotated slightly it will impart slight endwise movement to the rack 11 and thus open the servo-valve 20 for admitting pressure to the cylinder 22 and thus move the worktable 1 hydraulically. Continued rotation of the handle will cause the connected rack gear wheel 10 to in effect roll along the rack 11, which will be moving with the table, and at the same time hold the valve 20 open so that the hydraulic pressure will still move the worktable without manual effort on the part of the operator. When the handle movement is arrested the rack will be slightly retracted, thus closing the valve and arresting the movement of the worktable. It will be appreciated that in this manner simple mechanical control of hydraulic power to the worktable is provided.

If so required, a further hydraulic system may be incorporated which can be valve controlled and used to by-pass the aforesaid servo-control valve as required. Moreover, such additional system, or a further system, may be linked up to a hydraulic tracer control unit employed on the machine tool. It will be seen that the mechanical control and servo-control valve may be cut out when desired, say for a return motion of the worktable, by use of the valve controlled direct pressure system and when this is employed the friction drive clutch 13 will come into operation to allow a required skidding action in the mechanical operating means. Also, such clutch would allow for required flexibility in the mechanical operating means should the handle be rotated by an operator quicker than is actually required.

The aforesaid control means may be mounted in either of two ways in that, instead of the rack slide 12 being on a movable part it may be on a stationary part, such as the underslide 2, and then the mounting bracket for the hand control means is secured to the table. The method of mounting will depend on circumstances, e.g., for a vertically movable machine tool knee it will generally be policy for the hand control means to move therewith. Also, with some large horizontal tables it may be advisable for the machine operator to move with the table in which case the hand control means will be mounted thereon and the rack slide be fixed.

What I claim is:

1. In a machine tool having a fixed support, a worktable connected to said fixed support for linear movement relative thereto, and a hydraulic system for moving said worktable relative to said support, said hydraulic system including a servo-control valve; means for operating said servo-control valve to cause movement of said worktable comprising two elements one of which is connected to said worktable and the other of which is connected to said support, one of said elements being a rack mounted for limited longitudinal movement in a direction parallel to the direction of movement of said worktable to control the operation of said control valve and the other of said elements being rotary operating means, said rotary operating means comprising a pair of spindles mounted at right angles to each other and geared together by a worm gear secured to a first one of said spindles and a pinion secured to the other of said spindles, said other spindle having a gear wheel thereon connected thereto by means of a spring-loaded friction clutch, said gear wheel being in meshed engagement with said rack, whereby initial movement of the rotary operating means causes the rack to move slightly longitudinally to operate the control valve to move the worktable so long as the movement of the rotary operating means is continued.

2. In a machine tool having a fixed support, a worktable connected to said fixed support for linear movement relative thereto, and a hydraulic system for moving said worktable relative to said support, said hydraulic system including a servo-control valve; means for operating said servo-control valve to cause movement of said worktable comprising two elements one of which is connected to said worktable and the other of which is connected to said support, one of said elements being rotary operating means and the other of said elements being a rack connected to said rotary operating means, said rack being slidably mounted in a rack slide for longitudinal movement in a direction parallel to the direction of movement of said worktable to control the operation of said control valve, said rack slide having a slot therein and said rack having a stop block extending into said slot, the longitudinal dimension of said stop block being less than the longitudinal dimension of said slot, whereby initial movement of the rotary operating means causes the rack to move slightly longitudinally to operate the control valve to move the worktable so long as the movement of the rotary operating means is continued.

3. In a machine tool having a fixed support, a worktable connected to said fixed support for linear movement relative thereto, and a hydraulic system for moving said worktable relative to said support, said hydraulic system including a servo-control valve; means for operating said servo-control valve to cause movement of said worktable comprising two elements one of which is connected to said worktable and the other of which is connected to said support, one of said elements being a rack slidably connected to said worktable for limited movement relative thereto in the direction of movement of said worktable to control the operation of said control valve and the other of said elements being rotary operating means, said rotary operating means comprising a gear wheel in constant mesh with said rack, a rotary hand-operated element for rotating the gear wheel to apply linear thrust to the rack to open the valve and cause movement of said worktable, and a slippable clutch between the gear wheel and the operated element to prevent undue thrust from being applied to said rack.

References Cited in the file of this patent

UNITED STATES PATENTS

| | | |
|---|---|---|
| 1,245,823 | Tompkins | Nov. 6, 1917 |
| 2,068,889 | Roehm et al. | Jan. 26, 1937 |
| 2,311,010 | Vickers | Feb. 16, 1943 |
| 2,527,458 | Schurr | Oct. 24, 1950 |
| 2,601,157 | Le Lan | June 17, 1952 |
| 2,763,990 | Mercier | Sept. 25, 1956 |
| 2,897,788 | Rosebrook | Aug. 4, 1959 |

FOREIGN PATENTS

| | | |
|---|---|---|
| 467,377 | Italy | Dec. 5, 1951 |